United States Patent
Tijerina, Jr.

(10) Patent No.: US 8,282,313 B2
(45) Date of Patent: Oct. 9, 2012

(54) MOTOR POWERED, POLE-MOUNTED CONCRETE FINISHER

(76) Inventor: Louis J. Tijerina, Jr., Forney, TX (US)

(*) Notice: Subject to any disclaimer, the term of this patent is extended or adjusted under 35 U.S.C. 154(b) by 0 days.

(21) Appl. No.: 12/364,446

(22) Filed: Feb. 2, 2009

(65) Prior Publication Data

US 2009/0297269 A1    Dec. 3, 2009

Related U.S. Application Data

(60) Provisional application No. 61/025,660, filed on Feb. 1, 2008.

(51) Int. Cl.
*E01C 19/22* (2006.01)

(52) U.S. Cl. .......................................... 404/112

(58) Field of Classification Search ................ 404/112
See application file for complete search history.

(56) References Cited

U.S. PATENT DOCUMENTS

| | | | |
|---|---|---|---|
| 3,269,283 A * | 8/1966 | Grub | 404/112 |
| 3,361,044 A * | 1/1968 | Wolf et al. | 404/112 |
| 3,781,991 A * | 1/1974 | Stretton et al. | 30/276 |
| 4,477,203 A * | 10/1984 | Laditka | 404/111 |
| 6,516,598 B1 * | 2/2003 | Notaras et al. | 56/16.7 |
| 7,018,132 B2 * | 3/2006 | Ewer et al. | 404/112 |
| 7,104,725 B1 * | 9/2006 | Kipp et al. | 404/112 |
| 7,108,451 B2 * | 9/2006 | Ewer et al. | 404/112 |

OTHER PUBLICATIONS

Declaration of Louis Tijerina (dated May 29, 2012).

* cited by examiner

*Primary Examiner* — Gary S Hartmann
(74) *Attorney, Agent, or Firm* — Shiells Law Firm P.C.; Theodore F. Shiells

(57) ABSTRACT

A motor-powered concrete finisher, having a motor and a rotatable circular disc powered by the motor are attached at the end of a counter-balanced extension pole. A handle may be provided at or near the balance point of the extension pole. The motor may be disposed on the rear end of the extension pole, to assist in counterbalancing the weight of the circular disc, hub, front end of the extension pole and other weight on the front end of the extension pole. An angled gear drive on the front end of the extension pole, driven by a shaft extending through the extension pole, has an attachment hub at its end for attachment of the circular disc. The motor may be an internal combustion engine. The concrete finisher may be a weed trimmer having the weed trimmer attachment replaced by a rotatable circular disc.

5 Claims, 5 Drawing Sheets

MOTOR POWERED, POLE-MOUNTED CONCRETE FINISHER

CROSS-REFERENCE TO RELATED APPLICATIONS

This application relates to, and claims the benefit of the filing date of, co-pending U.S. provisional patent application Ser. No. 61/025,660 entitled "MOTOR-POWERED, POLE-MOUNTED CONCRETE FINISHER", filed Feb. 1, 2008, the entire contents of which are incorporated herein by reference for all purposes.

FIELD OF THE INVENTION

The present invention relates to finishing concrete, i.e., smoothing the surface of poured concrete before it sets. In particular, it relates to a novel powered concrete finisher having a powered circular disc attached at the end of a counter-balanced extension pole.

RELATED ART

Concrete finishing is traditionally done by hand, using hand trowels. Where the area is small, a worker will stand outside of the poured concrete and reach over the concrete to smooth the surface. On larger areas, a worker may begin by actually standing in the unset, poured concrete, and gradually step towards the outer edge of the poured concrete, smoothing and finishing the concrete as he/she goes.

On very large areas, such as a parking lot or large building slab, powered finishing equipment is sometimes used. Known powered finishing equipment consists of a rotating horizontal wheel having several trowel-like spokes, attached to a vertical axle that is powered by a motor held in a frame and disposed vertically directly above the wheel, similar to the general configuration of a typical floor polisher. Such known powered finishing equipment is operated by a worker standing upright next to the finishing equipment, holding onto handles, by pushing the rotating wheel as it rotates, with the trowel-like spokes smoothing the surface of the concrete.

Such known powered finishing equipment is limited, however, in that it is usually only useful for very large areas. Such known powered finishing equipment is also limited in that the unset concrete must bear the weight of the powered wheel and motor, which can reduce the finishing quality. Such known powered finishing equipment is also relatively large, expensive and cumbersome. The relatively large expense is particularly significant, since known powered concrete finishing equipment is usable for only the single purpose of finishing concrete, preventing the sharing of the cost of the equipment over other uses.

SUMMARY OF THE INVENTION

The present invention avoids the foregoing limitations of known powered finishers, thus making possible powered finishing of small and medium sized concrete pours, as well as large concrete pours.

In accordance with an embodiment of the invention, novel powered concrete finisher is provided having a powered, rotatable circular disc attached at the end of a counter-balanced extension pole.

In one aspect of this invention, a handle is provided at or near the balance point of the extension pole, while the rotatable circular disc is attached to a rotatable hub.

In another aspect of the invention, a motor for driving the circular disc is disposed on the rear end of the extension pole, i.e., the end farthest from the circular disc, to assist in counterbalancing the weight of the circular disc, hub, front end of the extension pole and other weight on the front end of the extension pole.

In another aspect of the invention, an angled gear drive is provided on the front end of the extension pole, which is driven by a shaft extending through the extension pole, the angled gear drive having an attachment hub at its end for attachment of the circular disc.

In a further aspect, the motor is an internal combustion motor.

In another aspect of the invention, the extension pole, motor, and angled drive assembly can be a weed trimmer, with the weed trimmer attachment replaced by the circular disc.

BRIEF DESCRIPTION OF THE DRAWINGS

For a more complete understanding of the present invention and the advantages thereof, reference is now made to the following Detailed Description taken in conjunction with the accompanying drawings, in which.

DETAILED DESCRIPTION

Figure 1:
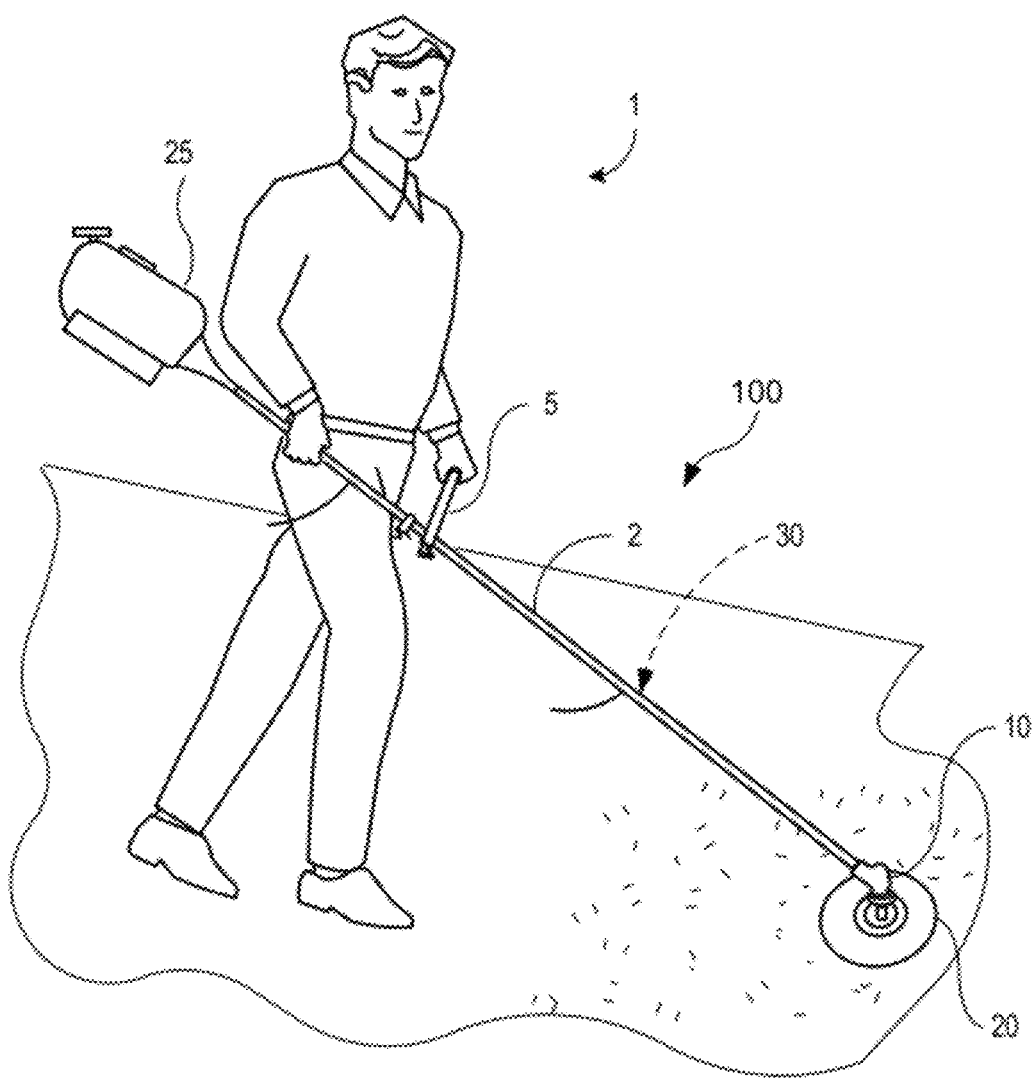
FIG. 1 depicts a view of the concrete finisher 100 in use by a user.

Referring now to the drawings in detail, and initially to FIG. 1 thereof, a view of the concrete finisher 100 in use by a user 1 is depicted. Finisher 100 includes an extension pole 2, a handle 5, an angle gear drive 10 having an output shaft 15 (not shown in FIG. 1), to which is attached a rotatable concrete smoothing disc 20.

A motor 25 for rotatably driving the disc 20 is provided. Motor 25 can conveniently be either electric or internal combustion powered. However, in order to have sufficient power to smooth the concrete effectively, the horsepower of the motor 25 should be sufficient to easily rotate the disc on wet concrete. Larger diameter discs, in general, required more horsepower. A two-cycle engine's 28 cc is generally sufficient for discs up to 14 inches, although other sizes and types of motors are possible, depending upon the type of concrete and size of disc.

Advantageously, the motor 25 is mounted to the rear end of the extension pole 2, to counter balance the weight of the angle gear drive 10 and disc 20 at the front end of the extension pole 2, when the user 1 is holding the concrete finisher 100 in the normal manner, by means of the handle 5 and a portion of the extension pole 2 between the motor 25 and the gear drive 10. An extended drive shaft 30 (not shown in FIG. 1) can extend through extension pole 2, which can conveniently be a hollow tube, to drive the gears in angle gear drive 10, which in turn drive the output shaft 15 and smoothing disc 20. In one embodiment, the portions of the finisher other than the angled gear drive 10, output shaft 15 and disc 20 can be based upon the same respective parts as a conventional powered pole-mounted weed trimmer.

Figure 2:
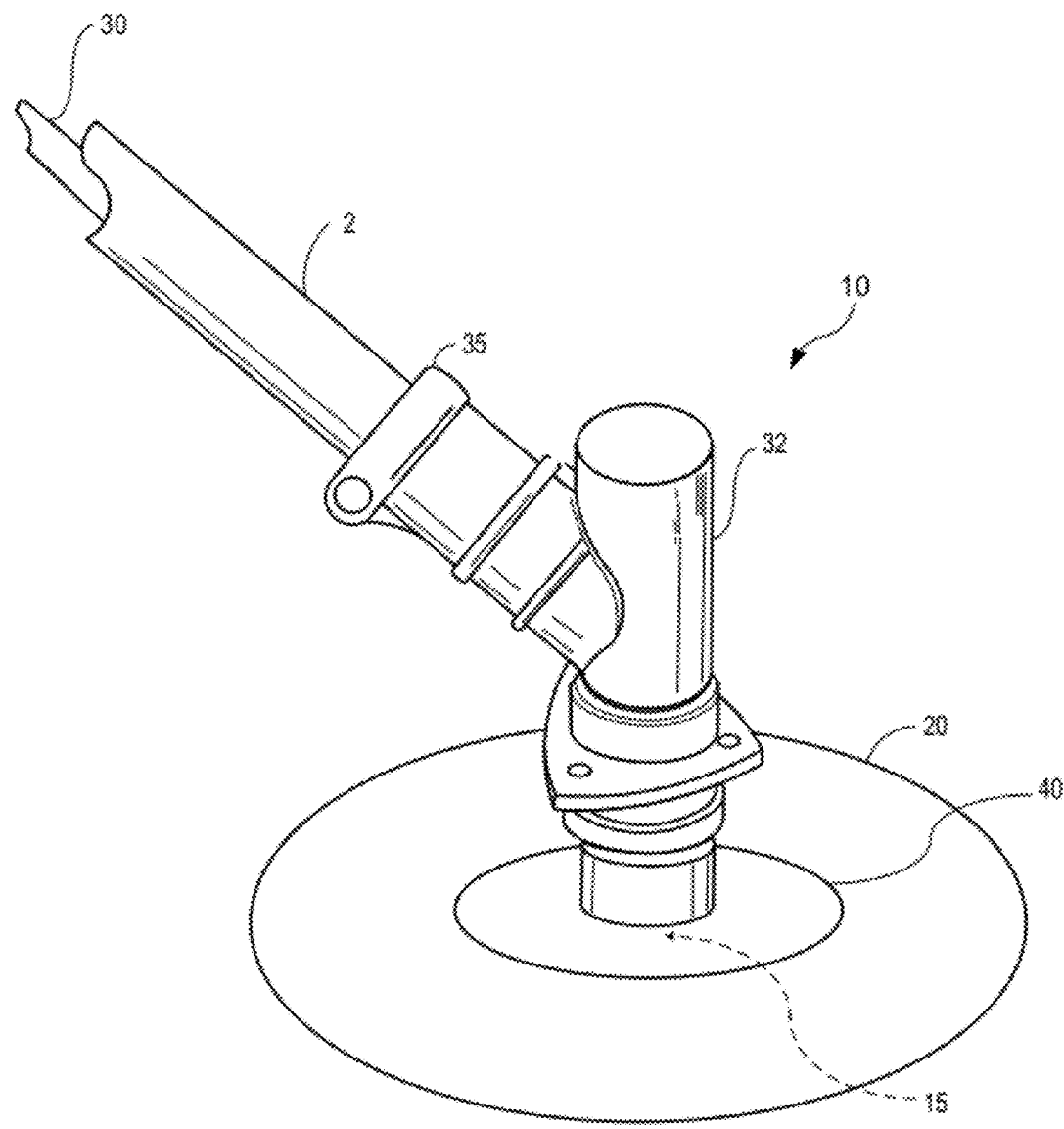
FIG. 2 depicts an enlarged view of the angled gear drive and smoothing disc.

FIG. 2 depicts an enlarged view of the angled gear drive 10 and smoothing disc 20. Angled gear drive has housing 32 including a mounting hosel 35 for receiving the front end of extension pole 2 and the drive shaft 30. Beveled gears can be disposed within housing 32 so that downwardly extending output shaft 15 can be rotated, and the disc 20 along with it, about an approximately vertical axis when the finisher 100 is in use.

Figure 3:
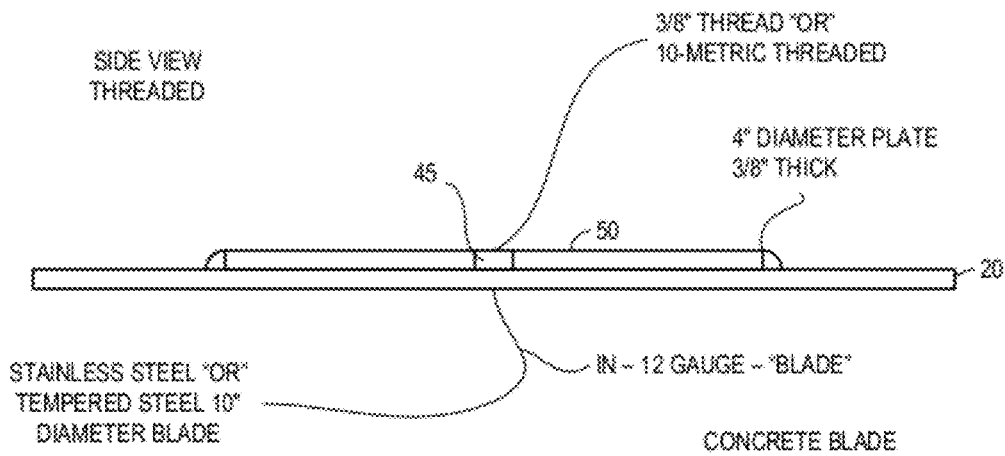
FIG. 3 depicts a side view of the disc and hub.

FIG. 3 depicts a side view of the disc 20. In order to provide a place for attachment to output shaft 15 of the angled gear drive 10, a hub 50 can be attached to the upper side of disc 20, conveniently by welding hub 50 to the top of disc 20. Hub 50 can have a threaded hole 45 in the center thereof, for mounting to output shaft 15, which extends from the angled gear drive 10. Hub 50 can conveniently be steel, or other strong material, and have a thickness of approximately $3/8$ inch. The diameter of hub 50 can be 4 inches or other convenient size consistent with strength requirements. Other materials, diameters and thicknesses for hub 50 are also possible.

Disc 20 can then mounted onto the output shaft 15 by threading hub 50 onto the threaded end of output shaft 15. Depending upon the direction of drive of the motor 25, threads of output shaft 15 and the hole 45 in hub 50 should be normal or reverse threaded, whichever tends to cause tightening when disc 20 is rotated against wet concrete.

When disc 20 is rotatably attached by means of threading hub 50 onto threaded bolt (output shaft) 15, disc 20 itself will not require a hole in it's middle on the side in contact with wet concrete during use. This helps the finisher 100 to smooth the concrete better. However, it will be recognized that other means of attaching disc 20 to be rotatably drivable by means of the output shaft 15 are possible, including a screw through the center of disc 10 into output shaft 20, welding a center shaft onto the upper side of disc 20, to be mounted in a chuck (not shown) on the output shaft 20 of angled gear drive 32, or many other ways.

Figure 4:
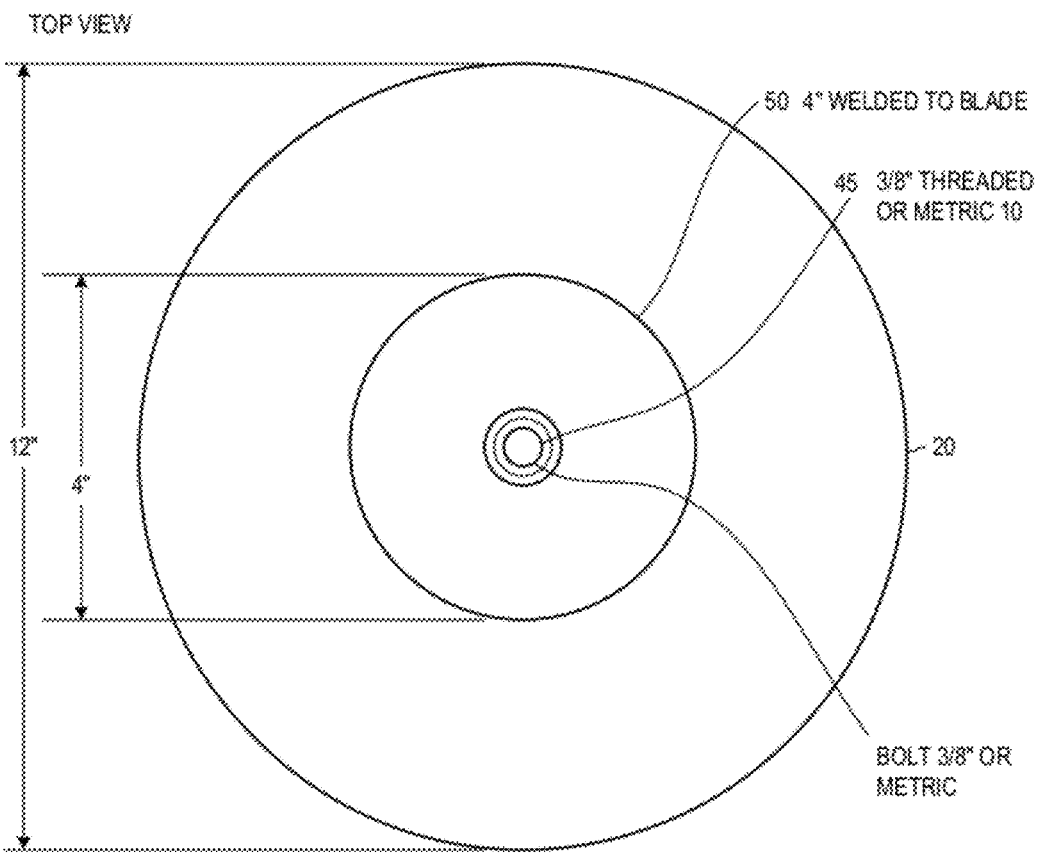
FIG. 4 depicts a top view of the disc and hub.
Figure 5A:
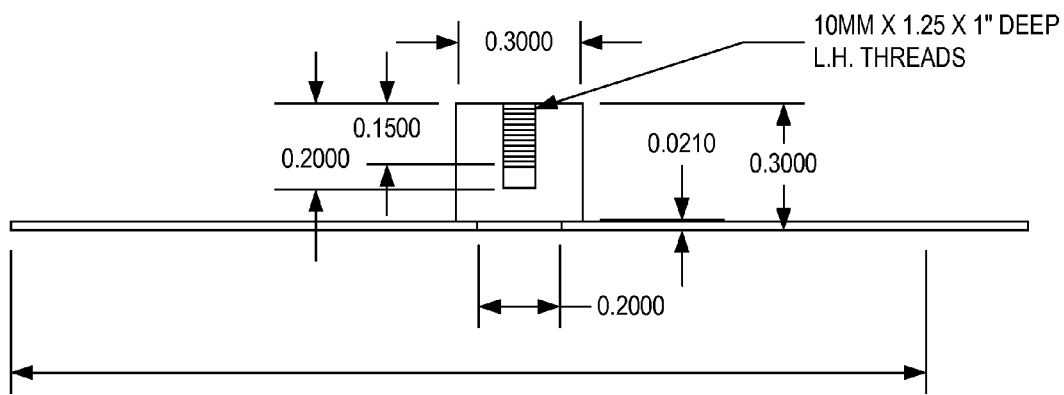
FIG. 5A depicts a dimensioned side view of the disc and hub.
Figure 5A:
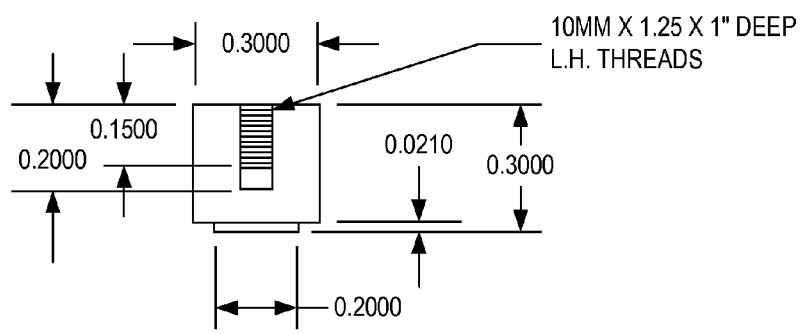
Figure 5A:
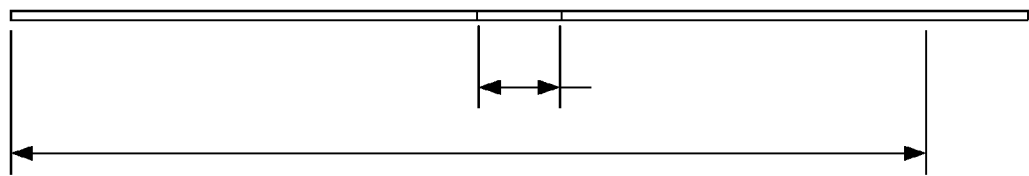
Figure 5B:
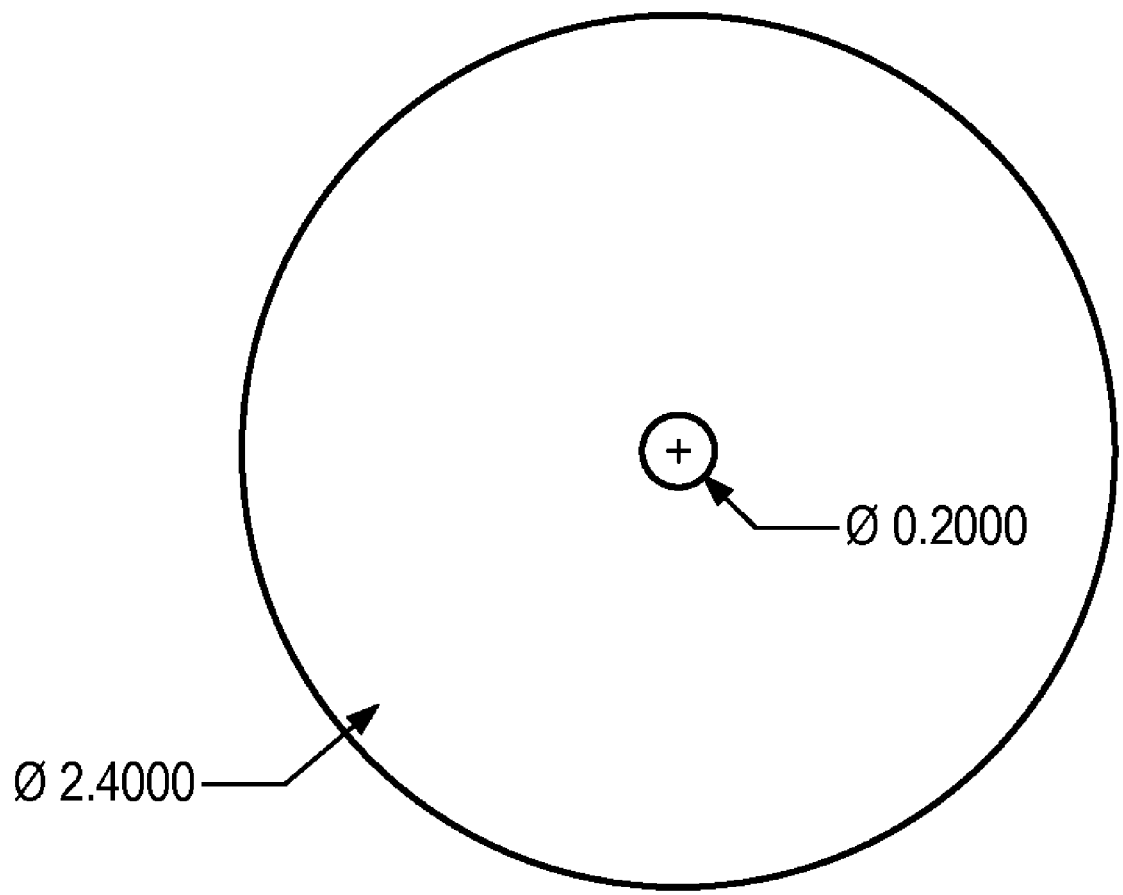
FIG. 5B depicts a dimensioned plan view of the disc.

FIG. 4 depicts a top view of the hub 50 and disc 20 to which it is mounted. Hub 50 can have a threaded hole 45 in the center thereof, for mounting to output shaft 15, which extends from the angled gear drive 10.

Conveniently, disc 20 can be in a range of sizes, 10 inch, 12 inch or 14 inch diameters being convenient. Stainless or tempered steel in a thickness of 12 or 14 gauge can be used, as well as other materials.

Returning now to FIG. 1, to use finisher 100, a user 1 can stand generally upright, either in an unsmoothed portion of the wet concrete to be finished on adjacent to it, holding finisher by means of a portion of extension pole 2 and handle 5. With motor 25 rotatably driving disc 20 through shaft 30, angled gear drive 32 and output shaft 15, the user 1 moves rotating disc 20 along the surface of the wet (i.e., uncured) concrete, smoothing its surface. Because the weight of the end of finisher 100 is generally counterbalanced, this is comfortable for the user 1 and very little effort is required to move the disc 20 to smooth the entire surface of the concrete. The finisher 100 can be used to float wet concrete, smooth and to a hard finish.

The present invention finisher is an attachment designed to be attached to the most common industrial heavy duty weed trimmers. The lightweight construction enables mobility to the user and increases production time in completing the job. The finisher is user friendly and attaches by twisting on to your existing heavy duty weed eaters no tools necessary.

The invention claimed is:

1. A motor-powered concrete finisher, comprising a motor and a relatively rigid rotatable circular disc having an outwardly exposed flat disc-shaped surface and being rigidly and centrally mounted to a rigid hub, said rigid hub being rigidly mounted to the distal end of a shaft powered by the motor, the disc and hub being disposed at one end of a counter-balanced extension pole having an axis, the motor being at the other end of said extension pole, so that during use by an operator to finish curing concrete, said exposed flat disc-shaped surface of said disc will rotate directly against the surface of the concrete as it cures with its axis in a fixed relative position with respect to the axis of the extension pole.

2. The motor-powered concrete finisher of claim 1, further comprising a handle at or near a balance point of the extension pole, while the rotatable circular disc is attached to a rotatable hub.

3. The motor-powered concrete finisher of claim 1, wherein the motor for driving the circular disc is disposed on the rear end of the extension pole, farthest from the circular disc, to assist in counterbalancing the weight of the circular disc, hub, and front end of the extension pole.

4. The motor-powered concrete finisher of claim 1, further comprising an angled gear drive on the front end of the extension pole, said gear drive being driven by a shaft extending through the extension pole, the angled gear drive having an attachment hub at one end thereof for attachment of the circular disc.

5. The motor-powered concrete finisher of claim 1, wherein the motor is an internal combustion motor.

* * * * *